US012134171B1

(12) United States Patent
Snyder

(10) Patent No.: US 12,134,171 B1
(45) Date of Patent: Nov. 5, 2024

(54) ON-VEHICLE TRACK BAR BUSHING REMOVAL TOOL FOR TRUCKS

(71) Applicant: Daniel Snyder, Latrobe, PA (US)

(72) Inventor: Daniel Snyder, Latrobe, PA (US)

( * ) Notice: Subject to any disclaimer, the term of this patent is extended or adjusted under 35 U.S.C. 154(b) by 6 days.

(21) Appl. No.: 18/527,523

(22) Filed: Dec. 4, 2023

Related U.S. Application Data

(60) Provisional application No. 63/591,790, filed on Oct. 20, 2023.

(51) Int. Cl.
*B25B 27/02* (2006.01)
*B25B 27/00* (2006.01)

(52) U.S. Cl.
CPC .......... *B25B 27/02* (2013.01); *B25B 27/0035* (2013.01)

(58) Field of Classification Search
CPC .... B25B 27/02; B25B 27/0035; B25B 27/062
See application file for complete search history.

(56) References Cited

U.S. PATENT DOCUMENTS

| | | | | |
|---|---|---|---|---|
| 4,207,664 | A * | 6/1980 | Zoula | B25B 27/062 D8/51 |
| 4,724,608 | A * | 2/1988 | Parrott | B25B 27/023 29/259 |
| 4,951,374 | A | 8/1990 | Barry | |
| 5,404,631 | A * | 4/1995 | Boyd | F16C 11/045 29/263 |
| 6,357,096 | B1 * | 3/2002 | James | B25B 27/062 29/263 |
| 6,389,668 | B1 * | 5/2002 | Hwang | B25B 27/062 29/263 |
| 6,591,469 | B1 | 7/2003 | Morin | |
| 7,191,504 | B1 * | 3/2007 | Charron | B25B 27/062 29/270 |
| 7,818,860 | B2 | 10/2010 | Hume et al. | |
| 9,120,215 | B2 | 9/2015 | Muenchrath et al. | |
| 9,174,331 | B1 | 11/2015 | Coughlan | |
| 9,956,674 | B2 | 5/2018 | Hargrove et al. | |
| 9,981,368 | B2 | 5/2018 | Zeren et al. | |
| 2012/0036691 | A1 * | 2/2012 | Mueller | B25B 27/062 29/263 |
| 2020/0269401 | A1 * | 8/2020 | Caywood | B64F 5/40 |
| 2024/0033887 | A1 * | 2/2024 | Andrews | B25B 27/023 |

* cited by examiner

*Primary Examiner* — Seahee Hong
(74) *Attorney, Agent, or Firm* — McNees Wallace & Nurick LLC

(57) ABSTRACT

A bushing removal tool for track bars on trucks. A male cup defines a seat adapted to contain the head of a bolt. The male inner end conforms substantially to the shape of a bushing such that it can cup the bushing. A female cup seats against the end of the track bar thus having a diameter greater than male inner end and adapted to provide a cup force axially in the positive direction against the track end. A ball bearing assembly seats within the female cup. A nut downstream of the ball bearing abuts the outer surface of the ball bearing attached to a threaded end of the rod end of the bolt, wherein upon rotation/operation of the nut, a pulling force of the bolt is applied to thereby pull out the bushing from the track bar end.

11 Claims, 3 Drawing Sheets

ON-VEHICLE TRACK BAR BUSHING REMOVAL TOOL FOR TRUCKS

CROSS-REFERENCE TO RELATED APPLICATIONS

The present invention claims benefit of provisional application Ser. No. 63/591,790 filed Oct. 20, 2023, the contents of which are incorporated herein by reference.

FIELD OF THE INVENTION

The invention pertains to automotive maintenance tools, specifically to a tool designed for on-vehicle removal of track bar bushings in trucks.

BACKGROUND OF THE INVENTION

Vehicle suspension, particularly in trucks and other vehicles with live axles, often utilizes a track bar, also referred to as a Panhard rod, to keep the front or rear axle aligned with the vehicle's centerline. The bushings holding the track bar in place are crucial to its functionality. When these bushings wear out or are not adequately robust, the bar and the axle might shift in lateral directions, leading to potential misalignment.

The bushings securing the track bar to the frame are typically injection-molded polyurethane bushings in a three-piece arrangement or bonded rubber styles mimicking the original design. However, these traditional bushings, while competent as vibration absorbers, often succumb to wear and fatigue, especially under rugged conditions or with aftermarket modifications, thus requiring removal and replacement.

Maintaining and replacing track bar bushings in trucks, particularly in the Super Duty series from 2005-2024, requires precise tools. Traditional methods often necessitate the complete removal of the track bar from the truck, leading to an extended service duration, potential damage risks, and added labor costs. This is because some form of mechanical or hydraulic press must be used to detach the bushings. In other words, because a track bar has two ends, each of which is fastened, respectively, to the vehicle axle and a slotted frame on the vehicle chassis, both ends of the track bar are disengaged and completely removed. In turn, the bushing at the frame-mounted end can be accessed. An efficient, on-vehicle solution that eliminates the need for total track bar removal is thus desirable.

SUMMARY OF THE INVENTION

It is the objective of the present invention to provide a tool for direct, on-vehicle bushing removal, circumventing the need to remove the entire track bar.

It is further an objective to provide for precision extraction, reducing risks of damage to the bushing or associated vehicle parts.

It is further an objective to provide time and labor savings with a streamlined bushing removal process.

It is further an objective to provide extended tool durability due to its tailored design for Super Duty trucks.

Accordingly, the instant invention comprises a tool for removing a track bar bushing, which enables users to unbolt only one end of the track bar from a vehicle chassis, lower it, and then conveniently remove the factory bushing while the other end of the track bar remains attached to the truck.

This design significantly simplifies the removal process, reduces potential vehicle downtime, and minimizes the risk of any ancillary damage.

More particularly, comprehended is a bushing removal tool, comprising: a male cup having a male outer end and a male inner end; the male outer end being cylindrical to define a seat adapted to contain the head of a bolt; the male inner end integral to the male outer end being cylindrical and concentric therewith to define a pocket; the male inner end and the male outer end separated by an internal flange which defines an annular opening and on which the head end of the bolt can abut upon the application of an axial pulling force in the negative direction (relative to ring formed at the track bar end); the male inner end having an inner diameter which conforms substantially to the shape of a bushing such that it can cup the bushing, wherein upon said axial pulling force in the negative direction being applied to the male cup, a bushing axial force in the same negative direction against said bushing is concurrently applied; a female cup having a female inner end and a female outer end; the female inner end being tubular to form a rim at its innermost end, a base at its outermost end, a through-hole defined through said base; the through-hole having a diameter which is similar to the diameter of the annular opening (of the male cup); the through-hole substantially conforming to the shape of the rod end of the bolt; the rim adapted to statically seat against the end of the track bar thus having a diameter greater than male inner end and adapted to provide a cup force axially in the positive direction against the track end; the female outer end having a collar generally concentric with the female inner end and having defined thereon a cylindrical cavity defined by said base and said collar; a ball bearing assembly having an outer surface and an inner surface and adapted to encircle the rod end of said bolt and further adapted to seat within the cylindrical cavity with the inner surface abutting the base; and, a nut downstream of the ball bearing adapted to abut the outer surface of the ball bearing (distal from the head end of bolt) attached to a threaded end of the rod end of the bolt; wherein upon counter-clockwise rotation/operation of the nut, a pulling force of the bolt is applied in said negative direction working against the positive axial force of, in combination, the nut, ball bearing and the female cup to thereby pull, sequentially, the head end of the bolt into the male cup and, in turn, the bushing, in the negative direction such that the bushing is removed from the track bar end.

Further, the method of servicing a bushing mounted in a track bar end of a track bar mounted to a frame of a vehicle, comprises the steps of: unbolting the track bar end containing the bushing from the frame of the vehicle; mounting a male cup on a first side of the bushing to be removed from the track bar end; mounting a female cup to a mounting point of the track bar end, the mounting point being on the track bar end opposite the first side of the bushing; passing a bolt through an annular opening of the male cup and through a bore of the bushing, wherein the bore had previously contained a securement bolt for the track bar end to the frame; passing said bolt through a through-hole of the female cup such that a bolt end resides axial and exterior to the female cup; mounting a ball bearing assembly to the bolt end; mounting a nut to a threaded end of the bolt end; and, operating the nut against the ball bearing, wherein upon counter-clockwise rotation of the nut, a pulling force of the bolt is applied in a negative direction working against the positive axial force of the nut, ball bearing and the female cup, in combination, to thereby pull the head end of the bolt into the male cup and, in turn, the bushing, in the negative direction such that the bushing is removed from the track bar end.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
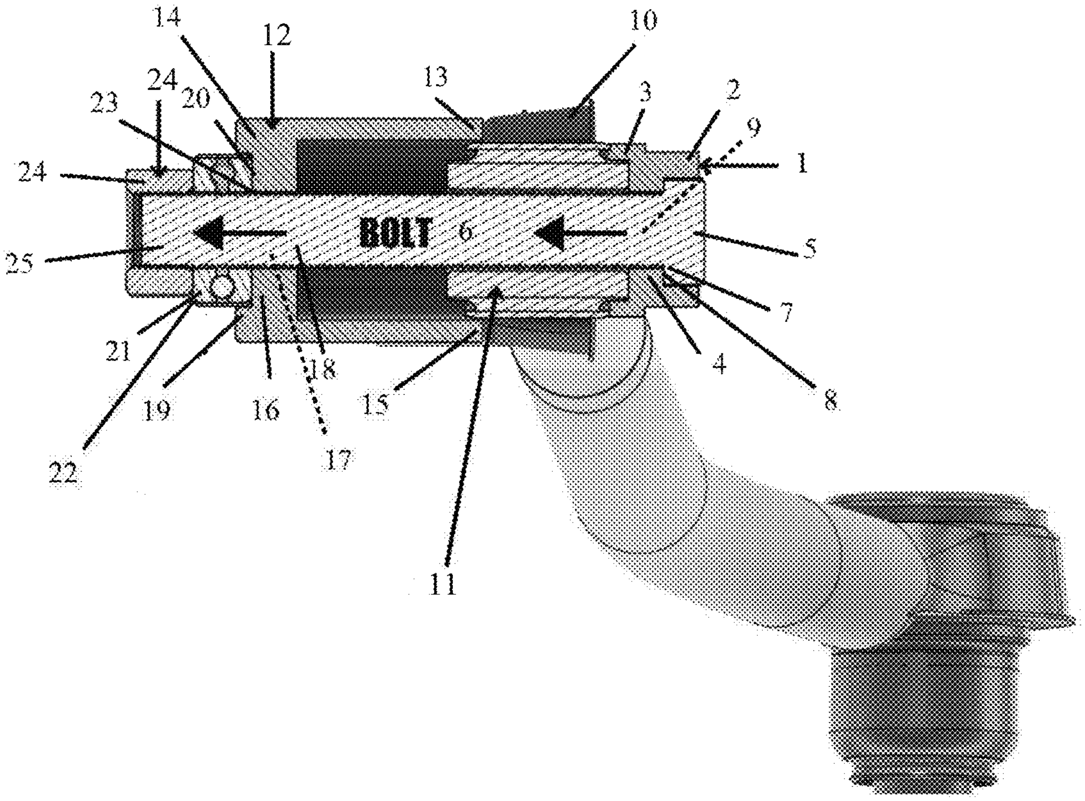
FIG. 1 shows a cross-sectional view of the instant removal tool through the vertical plane with a partial view of the track bar both in cross-section and perspective view.
Figure 2:
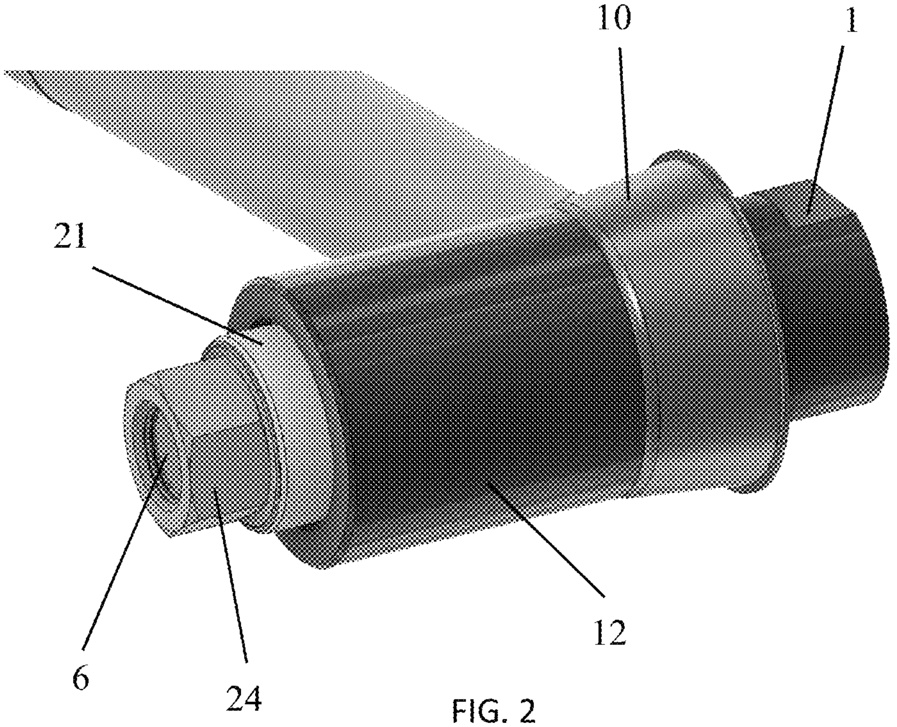
FIG. 2 shows a perspective view of the tool as assembled.
Figure 3:
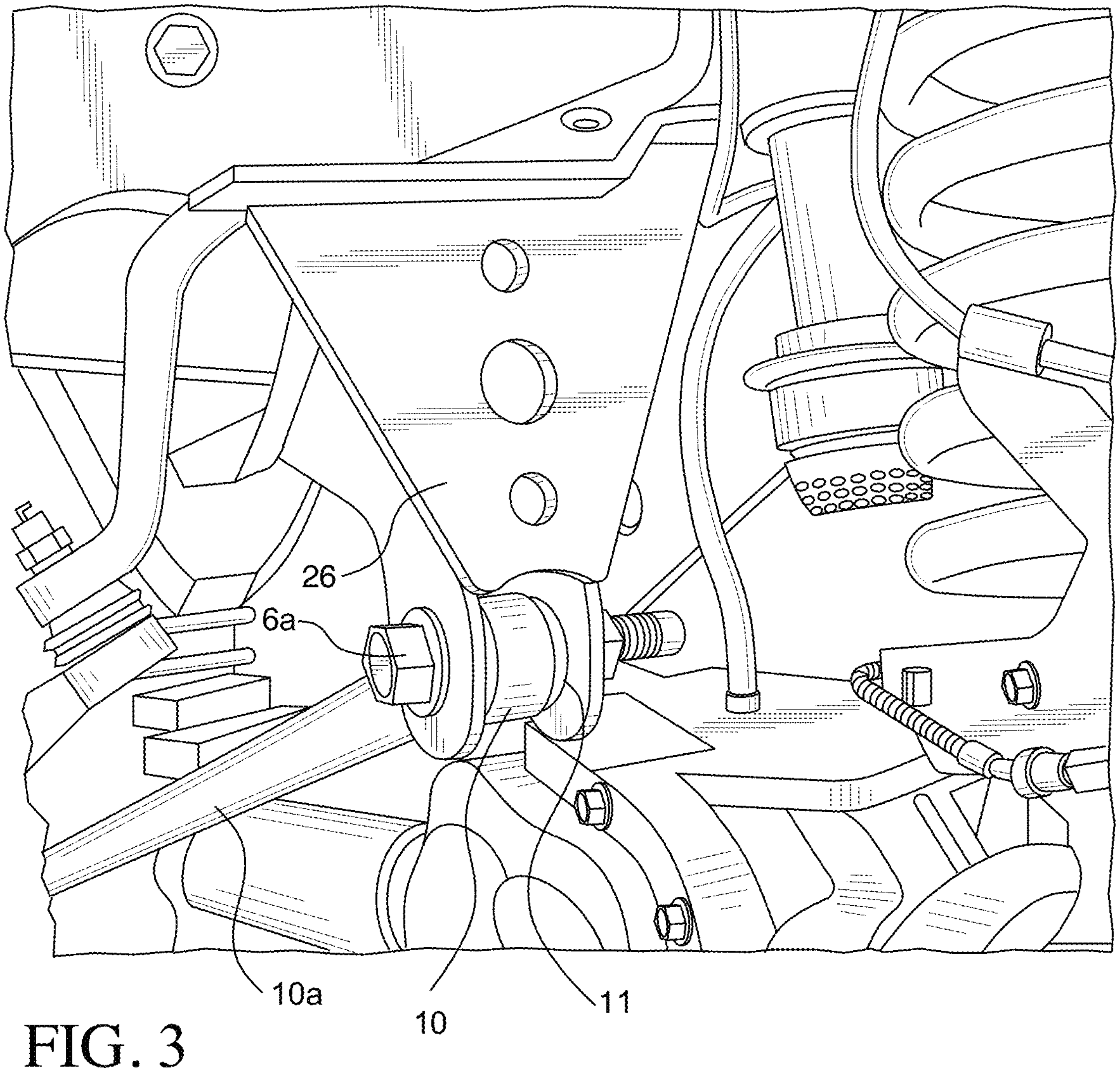
FIG. 3 shows a perspective view of a typical bushing and track bar installed on a vehicle suspension system frame.

With reference then to FIGS. 1-3, designed preferably for trucks having model year from 2005-2024, even more particularly for Super Duty models, although not limited thereto, the tool comprises, generally, custom cups 1, 12, a bolt 6, and a washer in the form of a ball-bearing assembly 21. To use generally, one positions the track bar bushing 11 between the cups 1, 12. Upon tightening the bolt 6, the bushing 11 is effectively extracted from its slot in the track bar end 10 of track bar 10*a*, eliminating the need to detach the entire track bar 10*a* from the vehicle. The components are precision-engineered to ensure ease-of-use and efficiency during the bushing 11 removal process.

More particularly, comprehended is a bushing removal tool, which includes, generally, a male cup 1 and female cup 12. Male cup 1 has a male outer end 2 and a male inner end 3. The male outer end 2 is preferably cylindrical to define a seat 4 adapted to contain the head 5 of a bolt 6. The male inner end 3 is integral to the male outer end 2, being cylindrical and concentric therewith to define a pocket 7. The male inner end 3 and the male outer end 2 are separated by an internal flange 8 which defines an internal annular opening 9 as shown. The head 5 end of the bolt 6 abuts the internal flange 8 upon the application of an axial pulling force in the negative direction. "Axial" means along bolt 6 or through the cups 1, 12. "Negative" here means away from the ring/bracket formed at the track bar end 10. The male inner end 3 has an inner diameter which conforms substantially to the shape of a bushing 11 such that it can cup the bushing 11. The bushing removal tool's custom cup design is tailored to accommodate the specific size, shape, and configuration of the bushings found in the specified Super Duty truck models, thus "substantially" means the same or slightly less than or slightly greater than the width of the bushing 11 to the extent it can provide force, i.e., a "bushing axial force" to the bushing 11, wherein upon the same axial pulling force in the negative direction being applied to the male cup 1, the bushing axial force in the same negative direction is concurrently applied against the bushing 11.

Next, a female cup 12 has a female inner end 13 and a female outer end 14. The female inner end 13 is generally tubular and thus forms a rim 15 at its innermost end and a base 16 at its outermost end. A through-hole 17 is defined through the base 16, the through-hole 17 having a diameter which is identical or similar to the diameter of the annular opening 9 (of the male cup 1). The through-hole 17 cross-sectionally is similar and conforms substantially to the shape of the rod end 18 of the bolt 6. The rim 15 is adapted to seat against the end of the track bar 10, thus having a diameter greater than male inner end 3 and adapted to provide a cup force axially in the positive direction (i.e., towards) against the track bar end 10. The female outer end 14 has a collar 19 generally concentric with the female inner end 13 and further has defined thereon a cylindrical cavity 20 defined by the base 16 and the collar 19.

A ball bearing assembly 21 is included, having an outer surface 22 and an inner surface 23 and which is adapted to encircle the rod end 18 of the bolt 6. Ball bearing assembly 21 seats within the cylindrical cavity 20 with the inner surface 23 abutting the base 16. A nut 24 is downstream of the ball bearing assembly 21 adapted to abut the outer surface 22 of the ball bearing assembly 21 ("downstream" meaning distal from the head end 5 of bolt 6). Nut 24 is attached to a threaded end 25 of the rod end 18 of the bolt 6. As such, wherein upon assemblage of all of the aforementioned and thus upon counter-clockwise rotation/operation of the nut 24 on the bolt 6, a pulling force of the bolt 6 is applied in the negative direction working against the positive axial force (i.e., opposite the negative pulling force, back up towards the bushing 11) of, in combination, the nut 24, ball bearing assembly 21, and the female cup 12 to thereby pull, sequentially, the head end 5 of the bolt 6 into the male cup 1 and, in turn, against the bushing 11 in the negative direction such that the bushing 11 is removed from the track bar end 10.

Therefore, in use, the method of servicing a bushing 11 mounted in a track bar end 10 of a track bar mounted to a frame 26 of a vehicle, comprises the steps of: removing existing bolt 6*a* and thus unbolting the track bar end 10 containing the bushing 11 from the frame 26 of the vehicle; mounting a male cup 1 on a first side of the bushing 11 to be removed from the track bar end 10; mounting a female cup 12 to a mounting point of the track bar end 10, the mounting point being on the track bar end 10 opposite the first side of the bushing 11; passing a bolt 6 through an annular opening 9 of the internal flange 8 of the male cup 1 and through a bore of the bushing 11, wherein the bore had previously contained a securement bolt for the track bar end 10 to the frame 26; passing the bolt 6 through a through-hole 17 of the female cup 12 such that a bolt rod end 18 resides axial and exterior to the female cup 12; mounting a ball bearing assembly 21 to the bolt rod end 18; mounting a nut 24 to a threaded end 25 of the bolt rod end 18; and, operating the nut 24 against the ball bearing assembly 21, wherein upon counter-clockwise rotation of the nut 24, a pulling force of the bolt 6 is applied in a negative direction, working against the positive axial force of the nut 24, ball bearing assembly 21 and the female cup 12, in combination, to thereby pull the head end 5 of the bolt 6 into the male cup 1 and, in turn, the bushing 11, in the negative direction such that the bushing 11 is removed from the track bar end 10.

As can be apparent, the bushing removal tool's custom cup design is tailored to accommodate the size, shape, and configuration of the bushings found in Super Duty truck models. The precise fitment of the custom cups 1, 12 ensures the effective capture and removal of the bushing 11, without risking damage to the track bar or other surrounding components. The combination of the custom cups 1, 12, bolt 6, and ball bearing assembly 21 allows for even pressure application during the extraction process, ensuring the bushing's safe removal without damage to surrounding vehicle components. The tool's design facilitates quick and efficient extraction, reducing labor efforts and vehicle downtime. Further, it is optimized for repeated use, ensuring durability and long service life, even with frequent applications.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A bushing removal tool, comprising:

a male cup having a male outer end and a male inner end; said male outer end defining a seat adapted to contain a head of a bolt; said male inner end integral to said male outer end being concentric therewith to define a pocket; said male inner end and said male outer end separated by an internal flange which defines an annular opening such that said head of said bolt can abut said internal flange upon application of an axial pulling force in a negative direction; said male inner end having an inner diameter which conforms substantially to a shape of a bushing such that said male inner end can cup said bushing, wherein upon said axial pulling force in said negative direction being applied to said male cup, a bushing axial force in said negative direction is concurrently applied against said bushing;

a female cup adapted to seat against a track bar end;

a ball bearing assembly for seating against said female cup;

a nut downstream of said ball bearing assembly, said nut adapted to abut said ball bearing assembly, and said nut adapted to attach to a threaded end of said bolt; and, wherein upon assemblage and upon rotation of said nut along said bolt, a pulling force of said bolt is applied in said negative direction working against a positive axial force of, in combination, said nut, said ball bearing assembly and said female cup to thereby pull said head of said bolt into said male cup and, in turn, pull said head into said bushing in said negative direction such that said bushing is removed from said track bar end.

2. The bushing removal tool of claim 1, wherein said female cup has a female inner end and a female outer end; said female inner end being tubular to form a rim thereon.

3. The bushing removal tool of claim 2, wherein said rim has a diameter greater than said male inner end.

4. The bushing removal tool of claim 2, wherein said female cup further includes a base at its outer end and a through-hole defined through said base; said through-hole sized substantially similar to said annular opening of said internal flange such that said through-hole can receive a rod end of said bolt.

5. The bushing removal tool of claim 4, wherein said female outer end has a collar generally concentric with said female inner end; said collar having defined thereon a cylindrical cavity defined by said base and said collar.

6. The bushing removal tool of claim 5, wherein said ball bearing assembly further has an outer surface and an inner surface, said ball bearing assembly adapted to encircle said rod end of said bolt and seat within said cylindrical cavity with said inner surface abutting said base.

7. A bushing removal tool, comprising:

a male cup for cupping a bushing; said male cup having a male outer end and a male inner end;

a female cup having a female inner end and a female outer end; said female inner end being tubular to form a rim at its innermost end; said female cup including a base at its outermost end and a through-hole defined through said base; said through-hole substantially conforming to a rod end of a bolt; said rim adapted to statically seat against a track bar end of a track bar thus having a diameter greater than said male inner end; said female cup adapted to provide a cup force axially in a positive direction against said track bar end; said female outer end having a collar generally concentric with said female inner end and said collar having defined thereon a cylindrical cavity defined by said base and said collar;

a ball bearing assembly for seating against said female cup;

a nut downstream of said ball bearing assembly, said nut adapted to abut said ball bearing assembly, and said nut adapted to attach to a threaded end of said bolt; and, wherein upon assemblage and upon rotation of said nut along said bolt, an axial pulling force of said bolt is applied in a negative direction working against said positive axial force of, in combination, said nut, said ball bearing assembly and said female cup to thereby pull a head of said bolt into said male cup and, in turn, pull said head into said bushing in said negative direction such that said bushing is removed from said track bar end.

8. The bushing removal tool of claim 7, wherein said male inner end is integral to said male outer end and being concentric therewith to define a pocket.

9. The bushing removal tool of claim 8, wherein said male inner end and said male outer end are separated by an internal flange which defines an annular opening such that said head of said bolt can abut said internal flange upon application of said axial pulling force in said negative direction.

10. The bushing removal tool of claim 7, wherein said male cup is cylindrical.

11. The bushing removal tool of claim 7, wherein said ball bearing assembly has an outer surface and an inner surface, said ball bearing assembly adapted to encircle said rod end of said bolt; said ball bearing assembly adapted to seat within said cylindrical cavity with said inner surface abutting said base.

* * * * *